July 22, 1958  A. BRUEDER  2,844,012
VIBRATION ABSORBING TRANSMISSION DEVICES
Filed March 5, 1956
Fig. 5  Fig. 6
 
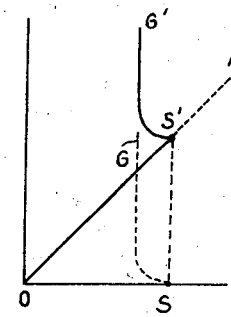
Fig. 4
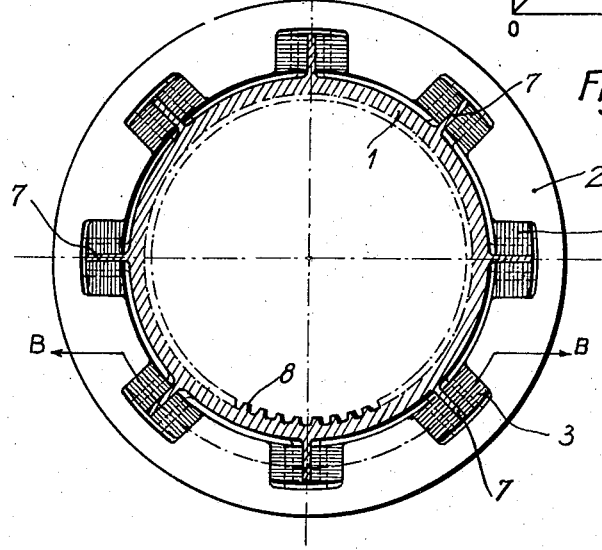
Fig. 1
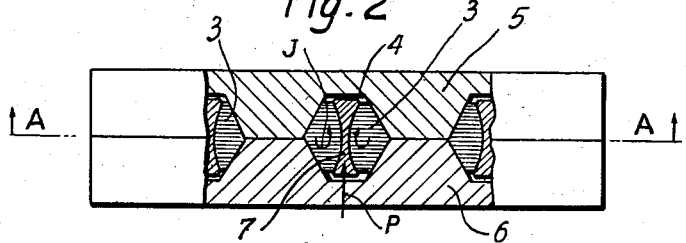
Fig. 2
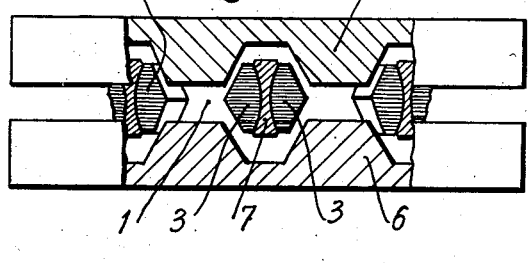
Fig. 3

United States Patent Office 2,844,012
Patented July 22, 1958

2,844,012

VIBRATION ABSORBING TRANSMISSION DEVICES

Antoine Brueder, Paris, France, assignor to Societe Anonyme Andre Citroen, Paris, France, a corporation of France Application March 5, 1956, Serial No. 569,327

Claims priority, application France September 24, 1955

1 Claim. (Cl. 64—14)

The present invention relates to vibration-absorbing transmission devices.

In devices for transmitting rotary motion it is frequently necessary to make provision for a certain variation in the axial length. This applies, for example, to the transmission of motion to steering wheels and driving wheels having two independent axles, in respect of which the transmission must be capable of coping with a variation in length, in such a way as to permit of free vertical clearance of the suspension in respect of any stearing lock of the car.

For this purpose there have been employed either slide means making use of dogs or grooves or devices permitting of a resilient variation in length, as of the bonded metal and rubber type or the like, or a combination of the two.

The use of sliding means is accompanied by the difficulty that upon the transmission of torque the driving force applied between the sliding surfaces renders a sliding movement impossible, so long as the axial force due to the clearance between the axle and the chassis is below a certain value S. This value is equal to $F \times f$ (threshold of the sliding motion), F being the driving force of the engine and $f$ being the friction coefficient between the sliding elements. So long as the commencing point has not been reached, the parts do not slide and the small vibrations are caused to be transmitted and produce noise. The passage through the threshold may itself be noisy.

The arrangement according to the invention permits of the operation of a transmission shaft in a manner as rigid as possible whilst absorbing small variations in length in respect of forces below the threshold of the sliding motion.

According to the invention a rim connected with the driving shaft comprises a series of blocks of rubber which are disposed within small cavities, in which they are compressed, and in which there engage the teeth of a second rim which is concentric to the first rim and is connected to the driven shaft.

The invention will now be described in greater detail with reference to the accompanying drawing, which shows a form of embodiment of the invention by way of example. In the drawing:

Fig. 1 is a plan view of the device along the line A—A in Fig. 2;

Fig. 2 is a view from above according to the line B—B before the two halves of the upper rim have been moved together;

Fig. 3 is a view from above according to the line B—B after the two halves of the upper rim have been moved together;

Fig. 4 is a graph illustrating the axial movements in relation to the forces;

Figs. 5 and 6 are front and end views of a block of rubber.

Upon referring to the drawing, it will be seen that the device is constituted by a central rim 1, which is driven by an outer rim 2 through the medium of blocks of rubber 3. These blocks, having a particular form possessing an outwardly curved face and two other faces of dihedral form, as will be apparent from Figs. 5 and 6, are placed in pairs in the cavities 4 formed in the outer rim 2. For this purpose the rim 2 is formed of two plates 5 and 6, which are symmetrical in relation to the middle plane, and which may be moved towards each other by screws or other suitable means, so as to compress the blocks of rubber between castellated portion of trapezoidal form.

This compression takes place only in circumferential direction, whereas, in contrast thereto, a certain freedom of motion is allowed (left) in axial direction, as is indicated by the clearance shown in Fig. 2 between the cells (cavities) 4 on the one hand and the blocks 3, on the other, which enclose the ribs 7 which will be described below.

Into each cavity and between the two blocks there extends a tooth or rib 7 integral with the inner rim 1. This tooth preferably has in a direction parallel to the axis of the rim concave faces co-operating with the outwardly curved faces of the blocks of rubber, in such a way that a relative movement between the rims tends to produce a rolling action of the blocks in the direction indicated by the arrows.

The rim 1 possesses on its inner periphery grooves 8 by means of which the movement is transmitted to a fluted shaft, which is not shown. In turn the rim 2 is connected to a driving shaft by means of one of its plates.

The arrangement thus formed differs essentially from known systems, whether of the bonded rubber and metal type or of the resiliently actuated kind.

In this apparatus the rubber operates either by traction or by compression. On the other hand in the arrangement forming the subject matter of the invention it operates simultaneously by compression for driving purposes and with a slight tractive effect for the purpose of absorbing axial thrust.

The latter is produced as indicated in Fig. 2 (arrow P). It tends to cause a rolling movement of the blocks in the direction of the arrows J against the surfaces between which they are compressed.

There is obtained in this way, owing to the particular form given to the rubber and due to the fact of its compression, an axial deformation greater than the deformation in the perpendicular direction, which is that resulting from the drive by the engine torque.

If the mechanical effect as compared with the axial thrust is converted into graphical form, there is obtained a graph as shown in Fig. 5.

In the grooves a force applied progressively to one of the sliding elements does not result at the commencement in any displacement. Proceeding from the value $S=f \times F$ the static friction is broken and the displacement increases abruptly, whilst the resisting force (friction of movement) diminishes, which is represented by the line SG.

In considering now the action of the resilient element, it will be found that this absorbs the forces along a line OA, and that, in consequence, there will be a resilient transmission of the axial forces up to the point S', where movement of the sliding elements will commence according to the line S' G'.

Vibrations are accordingly absorbed over the entire curve proceeding from O, whilst without the resilient element it would be necessary first to reach the point S to enable the sliding motion to absorb the vibrations.

It will be obvious that an arrangement of this nature may be used in various ways making use of its peculiarity of a certain tractive effect for the purpose of absorbing axial thrust.

I claim:

A rotary drive means for enabling the absorption of vibrations of weak amplitude in an axial direction comprising first and second circular rims; said first rim being constituted by corresponding plates each defining radial recesses of trapezoidal cross-section and opening toward the axis of said first rim, said plates cooperating to define hexagonal bores in said first rim, resilient blocks for said bores, said blocks defining surfaces corresponding to an angle of said hexagonal bores, two of said blocks being positioned in each of said bores at opposite angles of the hexagons and defining facing convex surfaces delimiting an opening with concave sides, said second rim being concentric with said first rim and being encircled thereby, radial teeth extending from said second rim into the openings, said radial teeth having concave faces for engaging with the convex surfaces of the blocks, and means on said second rim for connection to a driven shaft.

References Cited in the file of this patent

UNITED STATES PATENTS

| | | |
|---|---|---|
| 2,025,829 | Ricefield | Dec. 31, 1935 |
| 2,127,942 | Schmidt | Aug. 23, 1938 |
| 2,764,003 | Croset | Sept. 25, 1956 |